UNITED STATES PATENT OFFICE.

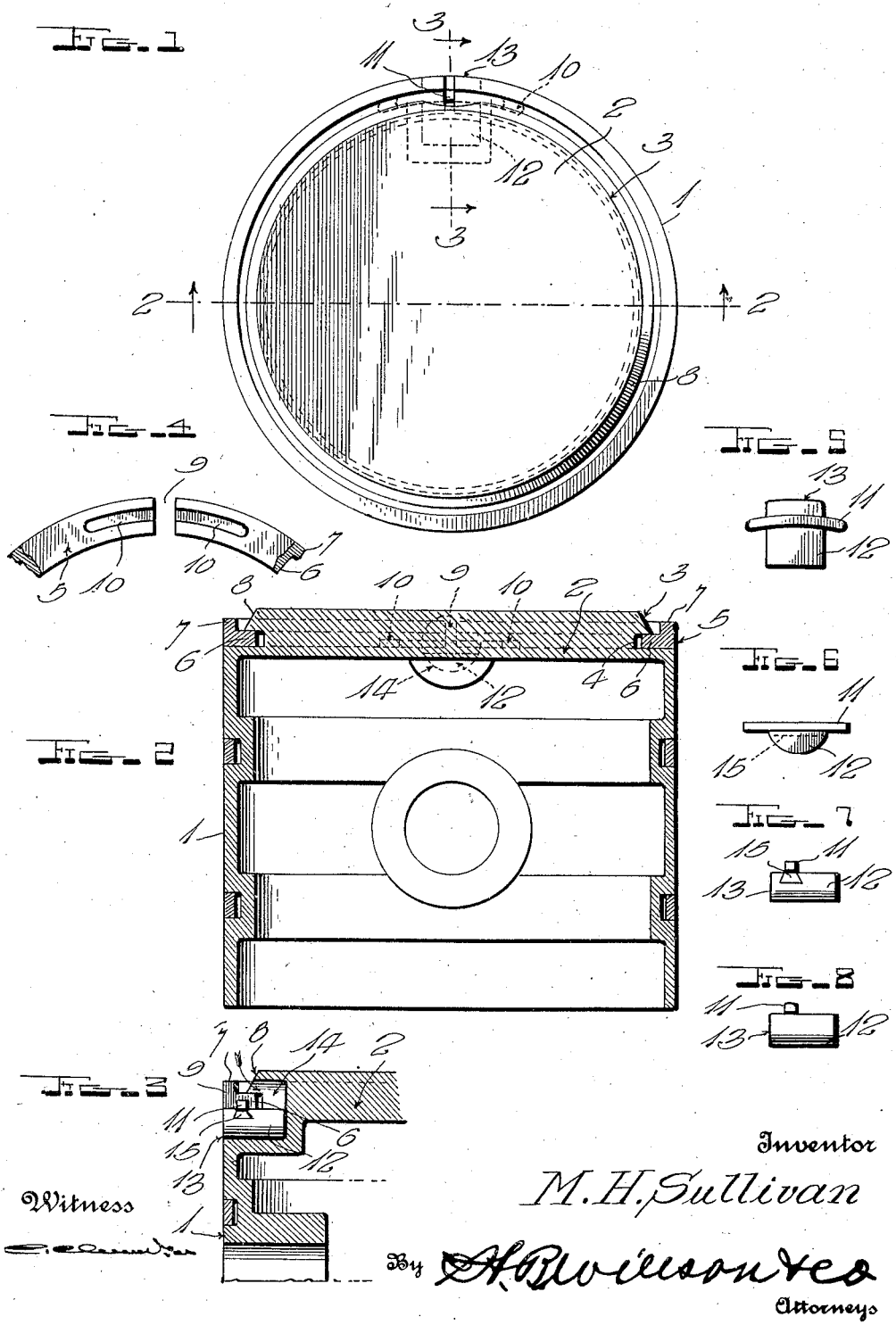

MICHAEL H. SULLIVAN, OF POUGHKEEPSIE, NEW YORK.

PISTON AND PISTON-RING.

1,364,005.  Specification of Letters Patent.  Patented Dec. 28, 1920.

Application filed August 28, 1919. Serial No. 320,368.

*To all whom it may concern:*

Be it known that I, MICHAEL H. SULLIVAN, a citizen of the United States, residing at Poughkeepsie, in the county of Dutchess and State of New York, have invented certain new and useful Improvements in Pistons and Piston-Rings; and I do declare the following to be a full, clear, and exact description of the invention, such as will enable others skilled in the art to which it appertains to make and use the same.

My invention relates to improvements in pistons and piston rings and has for one object to provide novel means for sealing the space between the piston ring ends, in such manner as to prevent the escape of compression and to insure that the ring shall maintain strictly circular form as it expands.

Another object is to so construct and mount the piston ring as to insure tight contact thereof with the wall of the piston groove, thereby preventing leakage of compression inwardly around the ring.

With the foregoing in view, the invention resides in the novel construction and arrangement of parts hereinafter described and claimed, the descriptive matter being supplemented by the accompanying drawing which forms a part of this application.

Figure 1 is an end elevation of a piston showing my improvement applied.

Figs. 2 and 3 are longitudinal sections on the planes indicated by the lines 2—2 and 3—3 of Fig. 1.

Fig. 4 is a plan view of the meeting ends of the pressure ring.

Figs. 5, 6 and 7 are respectively a plan, an end elevation and a side elevation of the block for sealing the space between the ends of the pressure ring and insuring the proper expansion of said ring.

Fig. 8 is a side elevation of a sealing block constructed in a slightly different manner from that above described.

In the drawings above briefly described, the numeral 1 designates a piston having a suitable piston head 2, the outer portion of which is reduced slightly in diameter as indicated at 3, a ring groove 4 being formed at the juncture of the two diameters of the piston. A self expanding pressure ring 5 of L-shape in transverse section has a comparatively wide flange 6 received in the groove and a narrower flange 7 designed for contact with the cylinder wall, said flange 7 being spaced outwardly from and concentric with the beveled edge 8 of the reduced piston head 2. The horizontal area of the ring 5 exposed to pressure in the cylinder is greater than the exposed vertical area, and by this construction and arrangement, the ring 5 is seated tightly against one wall of the groove 4 by the pressure in the cylinder, in much the same manner as the valves are seated, and consequently leakage inwardly around the ring is prevented.

The pressure ring 5 is split at 9 and one of the flat sides of said ring is provided with circumferentially extending grooves 10 which open into said split as seen in Figs. 2 and 4. An arcuate rib 11 concentric with the ring 5, is slidably received in the grooves 10 and is carried by an approximately semi-cylindrical block 12 whose flat side rests on the ring ends and seals the split 9 against the escape of compression. The outer end 13 of the block 12 is designed for contact with the cylinder wall and prevents the escape of any compression at this point.

The block 12 may be mounted in any suitable opening 14 in the piston, but such opening is by preference of circular form in order that it may be easily drilled, and in order that pressure may enter said opening as indicated by the arrow in Fig. 3, thus serving to retain the block in tight contact with the wall of the opening.

The block 12 seals the space between the piston ends, and the rib 11 and grooves 10 insure that the ring shall remain in proper circular form, regardless of the extent to which it expands. The rib 11 may be secured to the block 12 by a dove-tail or the like 15 or may be integral therewith, as illustrated in Fig. 8.

By constructing my invention in the novel manner shown and described, it will be highly efficient in preventing escape of compression, and may be easily and inexpensively manufactured. The improved ring and seal is of course used in connection with other piston rings of suitable form, and although I have shown the block 12 and rib 11 used in connection with one type of pressure ring, said block and rib might be employed in connection with other forms of piston rings. Furthermore, the reduced piston head, the groove 4 and the pressure ring 5, might be used without the sealing block, if desired. I prefer however, to incorporate both of these features in the same device since it has been found that by so doing a piston is obtained which is positively leak proof in all respects.

Since probably the best results are obtainable from the details disclosed, they may well be followed, but within the scope of the invention as claimed, numerous minor changes may well be made.

I claim:

A piston having a circular socket opening through its periphery adjacent the piston head, the axis of said socket being disposed on a radial line, said piston having a ring groove of less depth than said socket and opening into the latter near its longitudinal center, the piston head being reduced in diameter from its working surface to said ring groove to admit pressure into said socket, a semi-cylindrical sealing block filling the inner longitudinal half of said socket and having a flat side flush with the innermost side of the ring groove, a rib extending transversely across the flat side of said ring sealing block and projecting into the groove, and a ring in said groove having circumferentially extending grooves receiving said rib.

In testimony whereof I have hereunto set my hand.

MICHAEL H. SULLIVAN.